US008161521B1

(12) United States Patent
Venable, Sr.

(10) Patent No.: US 8,161,521 B1
(45) Date of Patent: Apr. 17, 2012

(54) CONTROLLING NETWORK ACCESS BY APPLYING SUPER SECURITY POLICIES (75) Inventor: Jeffrey C Venable, Sr., Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 934 days.

(21) Appl. No.: 12/042,577

(22) Filed: Mar. 5, 2008

(51) Int. Cl.
*G06F 17/00* (2006.01)
(52) U.S. Cl. ......... 726/1; 726/2; 726/3; 726/11; 726/27; 713/153
(58) Field of Classification Search .................. 726/1, 2, 726/3, 11, 27; 713/153; 709/223, 224, 225, 709/229; 707/783, 999.009
See application file for complete search history.

(56) References Cited

U.S. PATENT DOCUMENTS

2008/0148364 A1 * 6/2008 Hopen et al. ...................... 726/4
* cited by examiner

*Primary Examiner* — Edward Zee
*Assistant Examiner* — Baotran N To
(74) *Attorney, Agent, or Firm* — Harrity & Harrity, LLP (57) ABSTRACT

A device may monitor a security policy that governs a user access to a zone in a private network, propagate a change in status of the security policy to one or more devices that coordinate with each other to implement a super policy, detect whether conditions for triggering actions that are associated with the super policy are present based on the change in status, and perform the actions if the conditions for triggering the actions are present.

21 Claims, 9 Drawing Sheets

CONTROLLING NETWORK ACCESS BY APPLYING SUPER SECURITY POLICIES

BACKGROUND

In today's computing environments, securing a private network may involve installing appropriate mechanism, to defend the private network against attacks from foreign devices (e.g., denial-of-service attacks), to prevent unauthorized connections to the private network, and/or to control access to resources in the private network.

SUMMARY

According to one aspect, a device may include a processor configured to receive a message that indicates whether one or more conditions associated with a super policy are satisfied, each condition testing at least one of: whether a security zone in a private network is accessed by a user, or whether a security policy is applied to the user. The processor may be further configured to determine whether all of the one or more conditions associated with the super policy are satisfied based on the message and perform an action that is associated with the super policy to control user access to one or more zones in the private network when all of the one or more conditions are satisfied.

According to another aspect, a method may include monitoring a security policy that governs a user access to a zone in a private network, propagating a change in status of the security policy to one or more devices that coordinate with each other to implement a super policy, detecting whether conditions for triggering actions that are associated with the super policy are present based on the change in status, and performing the actions if the conditions for triggering the actions are present.

According to yet another aspect, a network may include means for communicating with devices in a network to give an effect to a super policy that is propagated to the devices, means for detecting changes in status of different security policies with respect to a user under a particular role, means for disseminating messages about the changes in status to the devices, means for determining if the changes in status satisfy conditions that are specified by the super policy, and means for performing actions that are specified by the super policy when the conditions are satisfied.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements.

The term "packet," as used herein, may refer to an Internet Protocol (IP) packet, a datagram, a cell, a fragment of an IP packet, or other types of data that may be carried at a specified communication layer. For example, a packet may refer to an IP packet that has been pre-pended with additional header fields (e.g., metadata fields).

The term "security policy" or "policy," as used herein, may include rules that permit or deny access to resources and/or services. As used herein, the term 'super policy" or "super policy" may refer to a security policy that may be applied upon activation, triggering, or use of other policies or security rules.

As used herein, the term "role" may refer to a defined entity that specifies properties associated with a particular communication session for a user who is mapped to that role. For example, a user that is logged in at a network as an "employee" may be provided with certain properties (e.g., which default servers the employee may access) associated with the role of "employee."

Figure 1:
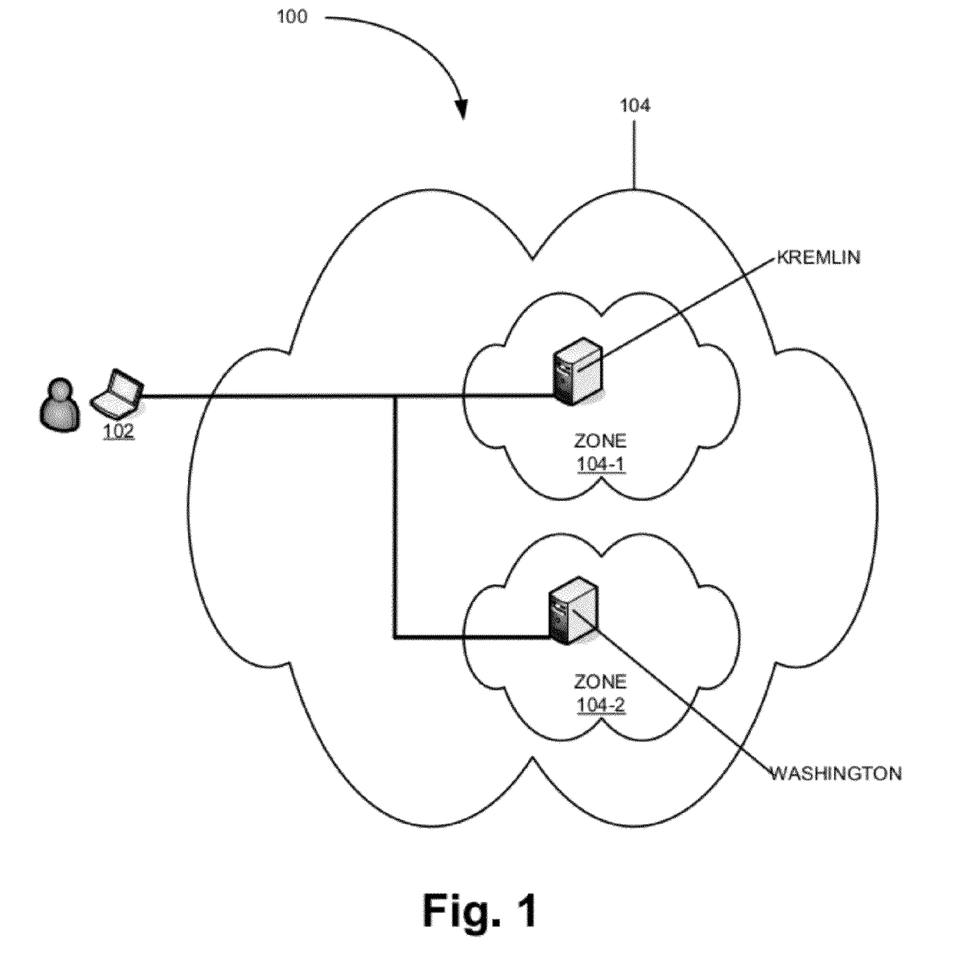
FIG. 1 is a simplified diagram that illustrates concepts described herein.

In the following, network access may be controlled by applying super security policies. FIG. 1 is a simplified diagram that illustrates concepts described herein. As shown, network 100 includes client 102 and a private network 104. In different implementations, network 100 may include additional, fewer, or different components than those illustrated in FIG. 1 (e.g., additional networks, network devices, etc.).

Client 102 may include a client application (e.g., a web browser, telnet client, etc.) for accessing resources in private network 104. Private network 104 may include network zones 104-1 and 104-2 (e.g., collections of network resources). As further shown, zone 104-1 and 104-2 may include resources Kremlin and Washington, respectively.

Assume that, in network 100, there are three security policies, policy A, policy B, and super policy C. Each of the policies may be applied to clients that access network 100. Policy A may permit client 102 to access Kremlin if client 102 meets an authentication requirement of network 100 (e.g., client 102 supplies a password and a user identifier (id)); policy B may permit client 102 to access Washington if client 102 meets another authentication requirement of network 100; and super policy C may inspect policy A and policy B, and if one of policies A or B is active, super policy C may prevent the other policy from taking effect.

More specifically, if client 102 connects to network 104 and accesses network resources in Kremlin, super policy C may prevent policy B from taking effect. Consequently, client 102 may not access resources in Washington. Similarly, if client 102 connects to network 104 and accesses Washington, super policy C may prevent client 102 from accessing Kremlin.

In the example, super policy C may take an action based on policies A and B. More generally, in implementations described herein, different super policies may use different types of securities policies and/or rules for controlling access to resources and/or zones in network 100.

Figure 2:
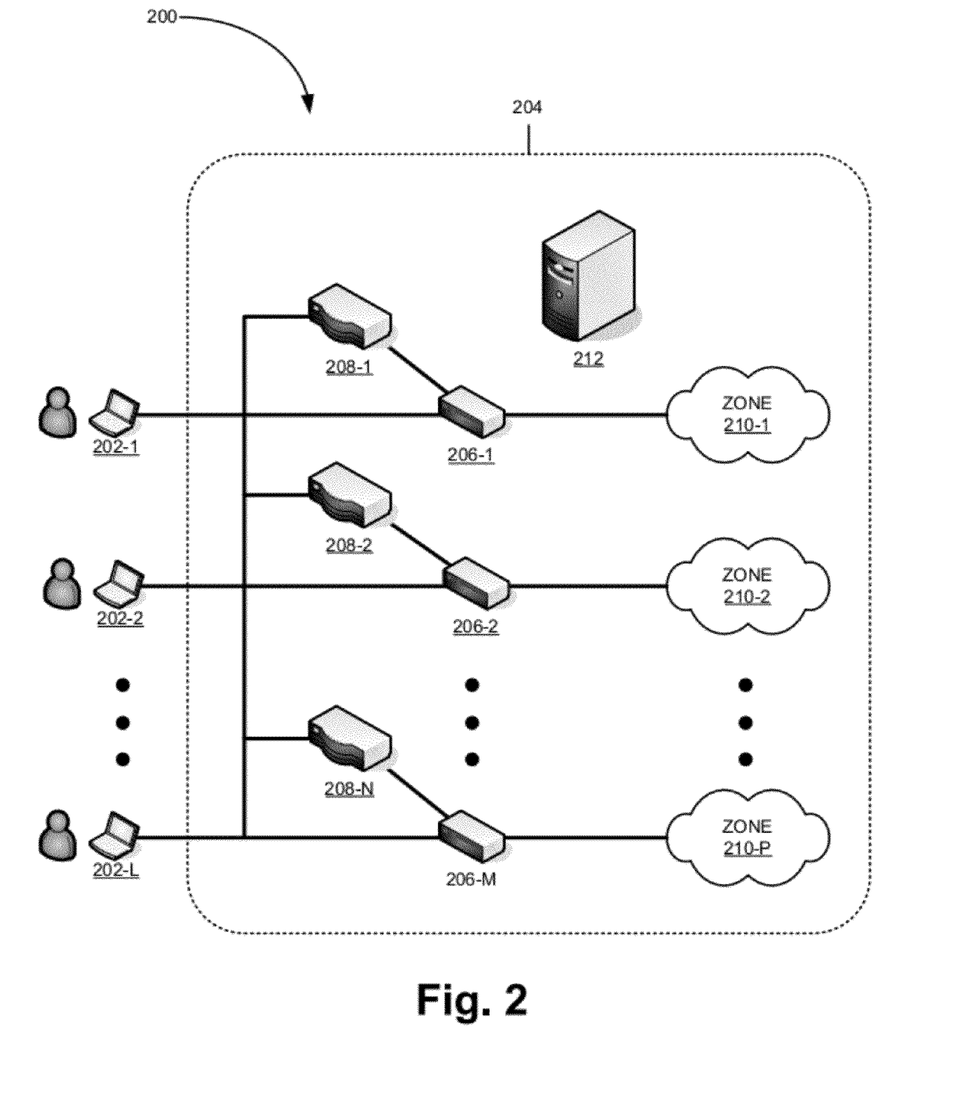
FIG. 2 is a block diagram of an exemplary network in which the concepts described herein may be implemented.

FIG. 2 is a diagram of an exemplary network 200 in which concepts described herein may be implemented. As shown, network 200 may include L client devices 202-1 through 202-L (herein collectively referred to as "client devices 202" and individually as "client device 202-x") and private network 204. Each of client devices 202 may include a device (e.g., a personal computer, a workstation, etc.) for hosting one or more client applications. The client applications may gain access to private network 204 and interact with resources therein, via different networks, such as the Internet, an ad hoc network, a local area network (LAN), a wide area network (WAN), a metropolitan area network (MAN), a cellular network, a public switched telephone network (PSTN), an intranet, or a combination of networks.

Private network 204 may include enforcement devices 206-1 through 206-M (herein collectively referred to as "enforcement devices 206" and individually as "enforcement device 206-x"), policy server devices 208-1 through 208-N (herein collectively referred to as "policy server devices 208" and individually as "policy server device 208-x"), zones 210-1 through 210-P (herein collectively referred to as "zones 210" and individually as "zone 210-x"), and a super policy device 212. Depending on implementation, private network 204 may include additional, fewer, or different components than the ones illustrated in FIG. 2. For example, private network 204 may include network access devices (e.g., serial terminal access controllers, modem pools, etc.) between client devices 202 and enforcement devices 206. In another example, private network 204 may include additional super policy devices.

Enforcement device 206-x may include a device for enforcing access policies. Enforcement device 206-x may receive security policies from policy server device 208-x and/or super policy device 212 and may enforce the security policies. Policy server device 208-x may include a device for validating a user's identity and/or a client application's security compliance. In addition, policy server device 208-x may manage network security policies that are created, edited, and/or saved by a security administrator. Policy server device 208-x may push such security policies to other devices in private network 204. Zone 210-x may include one or more protected resources (e.g., a database) and/or nodes to which a policy can be uniformly applied. Each of zones 210 may be protected from unauthorized user access by enforcement devices 206. Super policy device 212 may include one or more devices for monitoring policies that are in effect, activating super policies, and/or enforcing super policies. In different implementations, the functionalities of super policy device 212 may be included in enforcement devices 206 and/or policy server devices 208.

Figure 3:
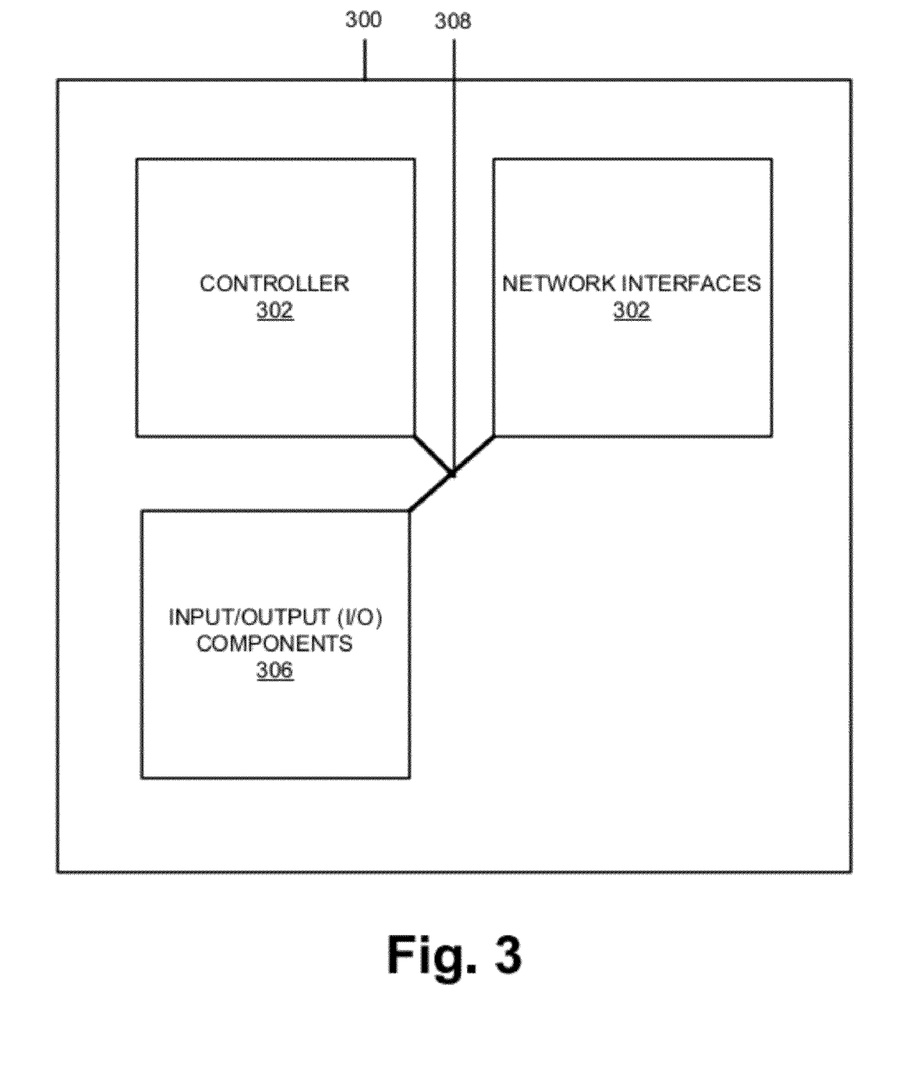
FIG. 3 is a block diagram of an exemplary network device of FIG. 2.

FIG. 3 is a block diagram of an exemplary network device 300 that may represent enforcement device 206-x, policy server device 208-x, and/or super policy device 212. Network device 300 may be implemented as a router, a firewall, a switch, a server device, or other types of network device. As shown, network device 300 may include a controller 302, network interfaces 304, input/output (I/O) components 306, and a communication path(s) 308. Depending on implementation, network device 300 may include additional, fewer, or different components than those illustrated in FIG. 3.

Controller 302 may include one or more devices for managing routes and/or performing services related to centralized processing. Controller 302 may include a processing unit and a memory. The processing unit may include one or more processors, microprocessors, Application Specific Integrated Circuits (ASICs), and/or Field Programmable Gate Arrays (FPGAs), and/or other processing logic. The memory may include static memory, such as read only memory (ROM), and/or dynamic memory, such as random access memory (RAM), or onboard cache, for storing data and machine-readable instructions. The memory may also include storage devices, such as a floppy disk, CD ROM, CD read/write (R/W) disc, and/or flash memory, as well as other types of storage devices.

Network interfaces 304 may include any transceiver-like mechanism that enables network device 300 to communicate with other devices and/or systems. For example, network interface 304 may include line interfaces for receiving packets from network devices in network 200/private network 204 and for transmitting the packets to other network devices in network 200/private network 204.

I/O components 306 may include a display (e.g., a liquid crystal display (LCD)), a mouse, a keyboard, and/or other types of devices for converting physical events or phenomena to and/or from digital signals that pertain to network device 300. Communication path(s) 308 may provide a path via which components of network device 300 can communicate with one another (e.g., peripheral components interconnect (PCI) bus, a switch fabric, etc.).

Figure 4:
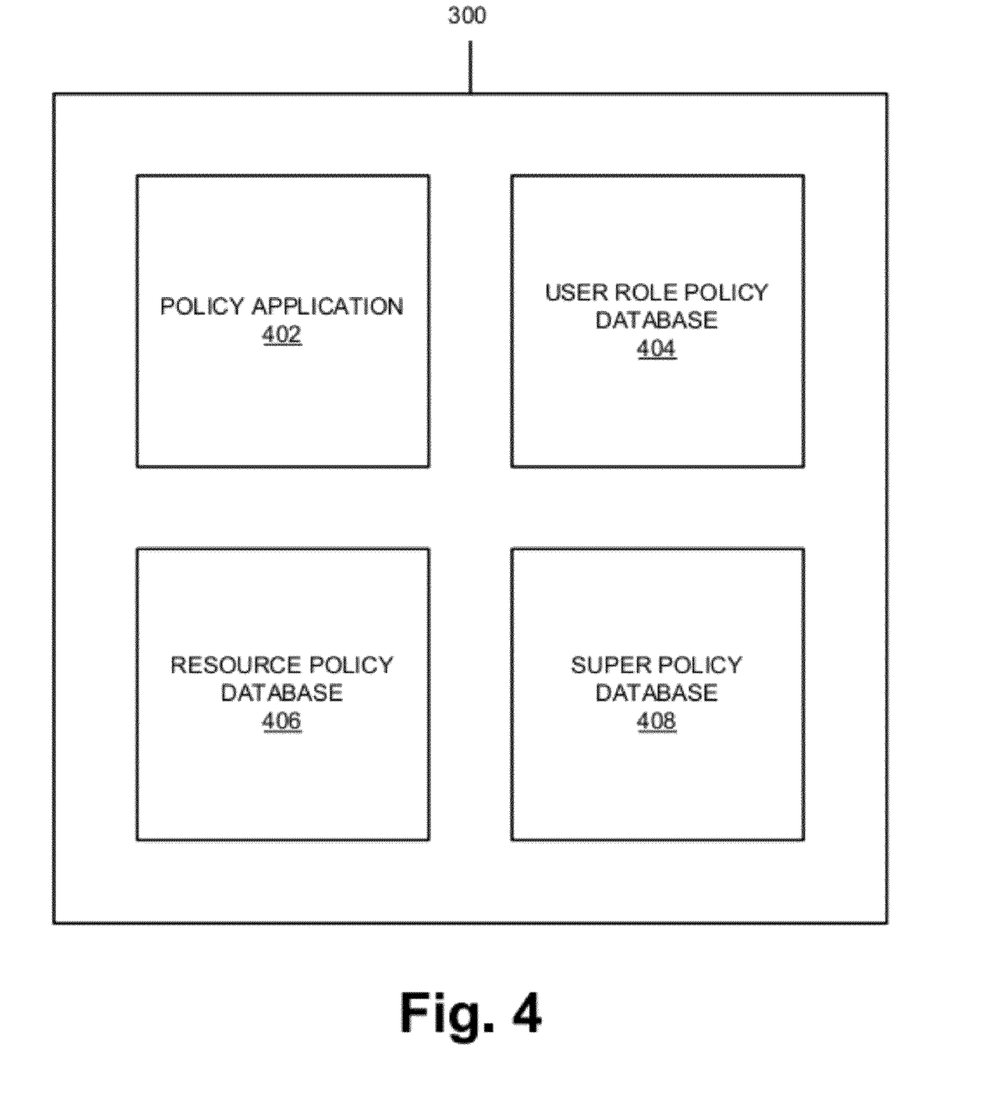
FIG. 4 is a functional block diagram of the exemplary network device of FIG. 3.

FIG. 4 is a functional block diagram of network device 300. As shown, network device 300 may include a policy application 402, a user role policy database 404, a resource policy database 406, and a super policy database 408. Depending on implementation, network device 300 may include additional, fewer, or different functional components than those illustrated in FIG. 4. For example, network 300 may include additional or different types of policy databases.

Policy application 402 may include hardware and/or software for enforcing an authentication and/or authorization protocol, such as Remote Authentication Dial In User Service (RADIUS) and/or extensible authentication protocol (EAP), to establish sessions between client devices 202 and access network 204. In addition, policy application 402 may allow a user or a security administrator to create, edit, and/or save different user roles and/or security policies. Policy application 402 may propagate the roles and security policies to other devices in network 204.

User role policy database 404 may include role mapping policies. A role mapping policy may include a list of roles from which a user may select, definitions of user session parameters and/or customizable and/or non-customizable personalization settings, restrictions, etc. For example, a user role policy may specify that the user may assume the role of an "employee," whether the user in that role may access private network 204 via a browser, from what Internet Protocol (IP) address the user may access private network 204, password access restrictions, etc.

Resource policy database 406 may include policies that specify which client devices 202 and/or client applications are allowed or denied access to one or more resources, which of enforcement devices 206 may be used by different client devices 202, what IP addresses may be assigned to client devices 202, etc.

Super policy database 408 may include super policies that are activated or applied upon triggering other security policies and/or rules.

Figure 5:
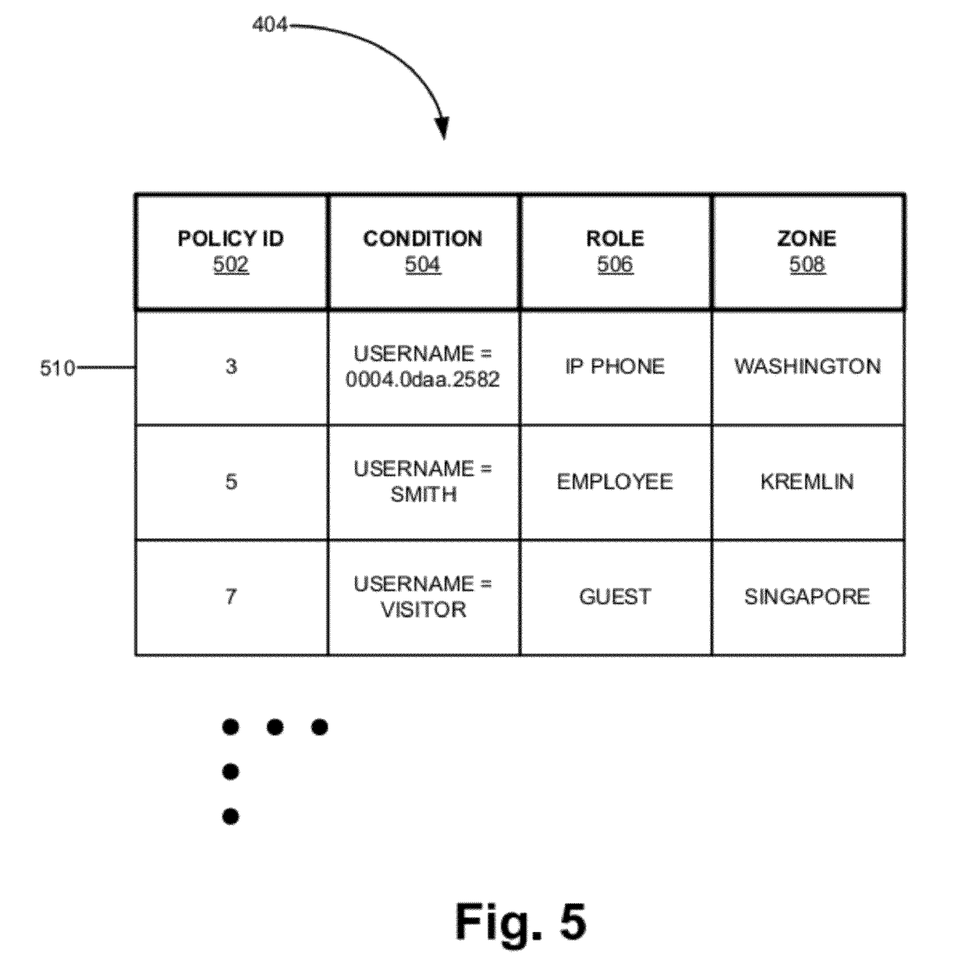
FIG. 5 is a block diagram of an exemplary user role policy database of FIG. 4.

FIG. 5 is a block diagram of user role policy database 404. As shown, user role policy database 404 may include a policy identifier (ID) field 502, a condition field 504, a role field 506, and a zone field 508. In different implementations, user role policy database 404 may include additional, fewer, and/or different fields than those illustrated in FIG. 5. For example, user role policy database 404 may include a virtual local area network (VLAN) field or a user identifier field. As further shown in FIG. 5, user role policy database 404 may include one or more records. One of the records is illustrated as record 510.

Policy ID field 502 may include information (e.g., policy ID) for identifying a specific policy that is associated with a record. For example, in FIG. 5, record 510 is shown as having policy ID of 3. Depending on implementation, policy ID may be unique within private network 204 or a portion of private network 204. Condition field 504 may include conditions for determining whether client device 202-x should be accorded a role that is specified in role field 506. For example, in condition field 504 for record 510, if a user name is "0004.0daa.2583," as provided by client device 202-x, the user to assume the role of IP PHONE.

Role field 506 may define allowed roles, such as permissions granted to a client when the condition in condition field 504 is satisfied. For example, role field 506 for record 510 may indicate that a client's role is IP PHONE. Furthermore, each role in role field 506 may be mapped to one or more access to different zones. Zone field 508 may specify a zone (e.g., VLAN, a portion of private network 204, a server at a specific IP address, etc.) that the client (e.g., a client application on client device 202-x or client device 202-x itself) with the corresponding role defined in role field 506 may access. For example, in record 510, zone field 508 may include a zone named Washington that may be accessed by the client. Depending on the implementation, a zone may be specified in different ways. For example, a zone may be specified in terms of network masks, specific IP addresses, one or more of other zones, URLs, etc. Furthermore, depending on the implementation, each zone may or may not overlap other zones.

Figure 6:
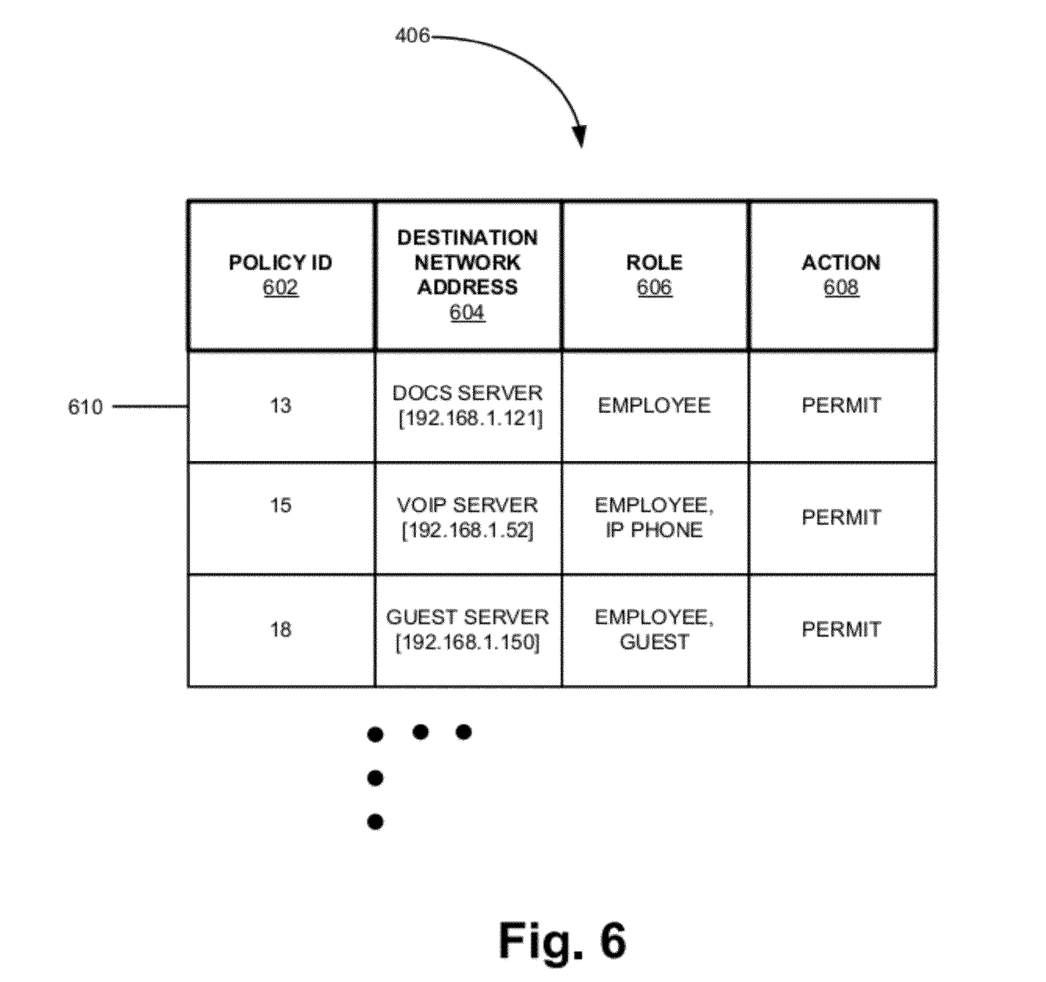
FIG. 6 is a block diagram of an exemplary resource policy database of FIG. 4.

FIG. 6 is a block diagram of an exemplary resource policy database 406. As shown, resource policy database 406 may include a policy ID field 602, a destination network address field 604, a role field 606, and an action field 608. As further shown in FIG. 6, resource policy database 406 may include one or more records. One of the records is illustrated as record 610. Depending on the implementation, resource policy database 406 may include additional, fewer, and/or different fields than the ones illustrated in FIG. 6.

Policy ID field 602 may include a policy ID for identifying a specific policy associated with a record. Destination network address field 604 may include the network address (e.g., IP addresses, a URL, etc.) of resources in private network 204. For example, destination network address field 604 for record 610 may include an address of "DOCS.SERVER." or "192.168.1.1." Role field 606 may include the role that may be allowed to access or not access the corresponding network address in destination network address field 604. Action field 608 may include the action that enforcement device 206-x may take when enforcement device 206-x receives network traffic destined for the corresponding network address in destination network address field 604 from client device 202-x based on corresponding role in role field 606. For example, action field 608 for record 610 may include "PERMIT." Accordingly, enforcement device 206-x may permit a user that assumes the role of "EMPLOYEE" to access a resource with network address DOCS.SERVER or 102.168.1.121. In a different implementation, action field 608 may include the action that enforcement device 206-x may take based on a network address in the destination network address field 604 when enforcement devices 206-x receives a role specified in role field 606.

Figure 7:
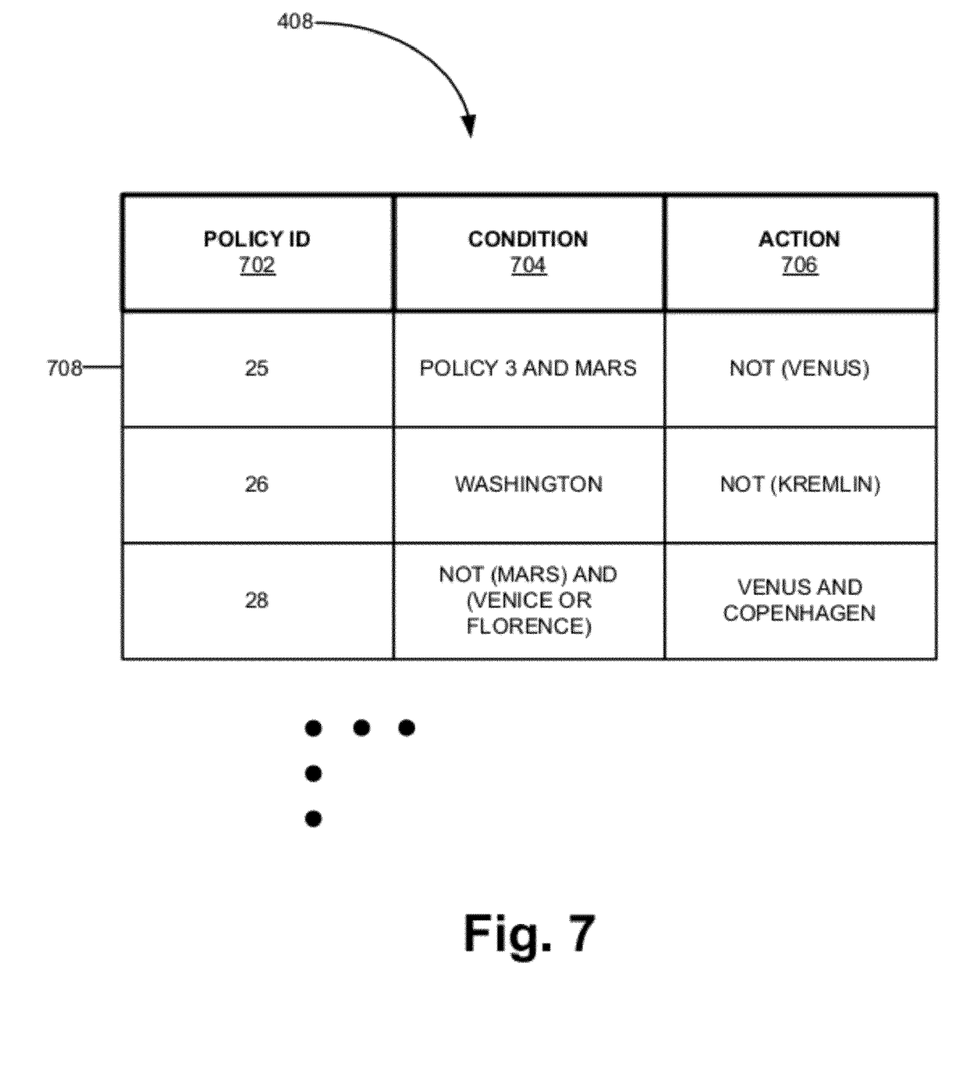
FIG. 7 is a block diagram of an exemplary super policy database of FIG. 4.

FIG. 7 is a block diagram of an exemplary super policy database 408. As shown, super policy database 408 may include a policy ID field 702, a condition field 704 and an action field 706. As further shown in FIG. 7, super policy database 408 may include one or more records, such as a super policy record 708. Depending on the implementation, records in super policy database 408 may include fewer, additional, or different fields than those illustrated in FIG. 7.

Policy ID field 702 may include a policy ID for identifying a specific policy that corresponds to a record. Condition field 704 may specify tests for determining whether an action that is specified in action field 706 should be performed. The tests may involve one or more user roles, resources, zones, security policies, and/or other rules. For example, in FIG. 7, condition field 704 for super policy record 708 may specify tests that involve whether Mars zone has been accessed and whether security policy 3 is in effect (See record 510 in FIG. 5 for policy 3).

Action field 706 may specify, if the conditions in condition field 704 are satisfied, what actions may be taken. The actions may affect which users may access which resources and/or zones. For example, in super policy record 708, if Mars is accessed and policy 3 is in effect, the client may be prevented from accessing Venus zone (e.g., "NOT (VENUS)"). In some implementations, action field 706 may also able or disable a particular security policy, depending on whether tests specified in condition field 704 are satisfied.

Figure 8A:
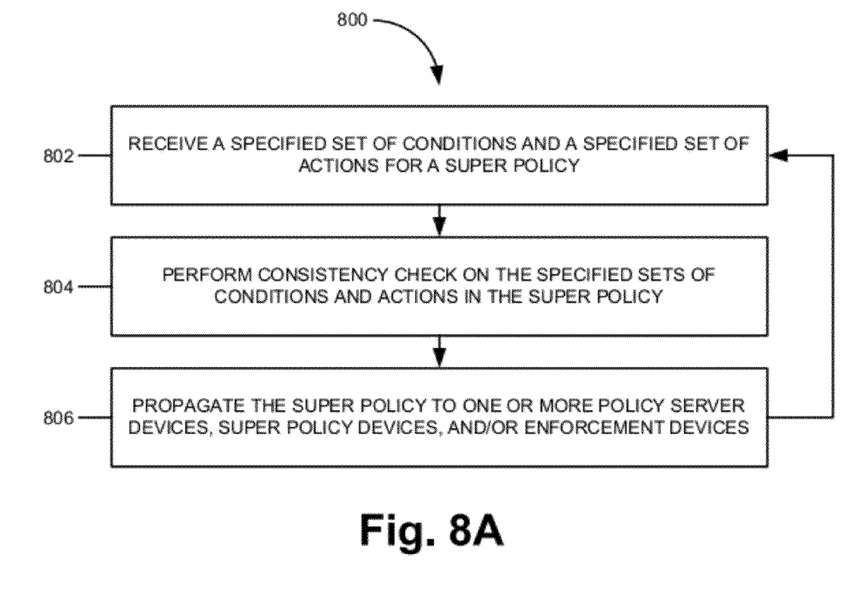
FIG. 8A is a flow diagram of an exemplary process for creating and/or editing a super policy.
Figure 8B:
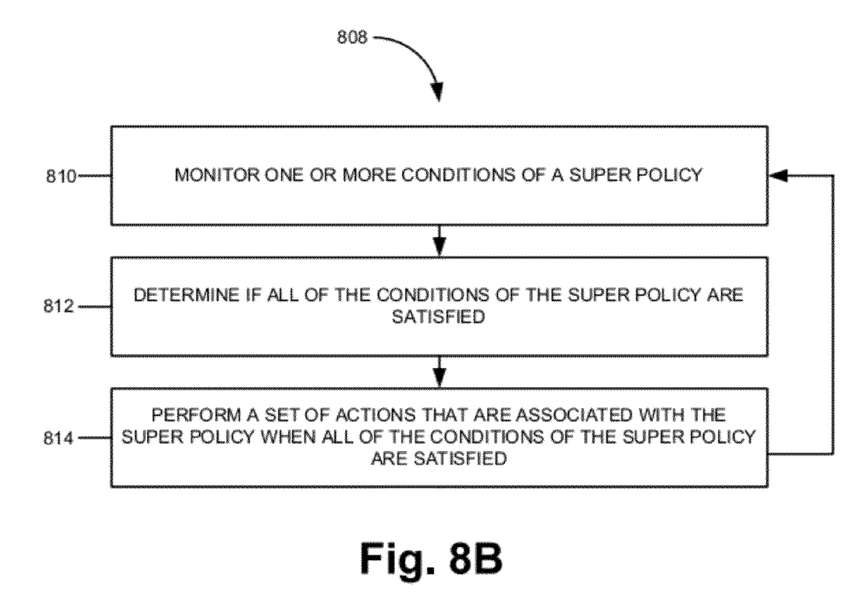
FIG. 8B is a flow diagram of an exemplary process for controlling network access by applying a super policy.

Exemplary Processes Related to Controlling
Network Access by Applying Super Security Policies The above paragraphs describe system elements that are related to devices and/or components for controlling network access by applying super security policies. FIGS. 8A and 8B are flow diagrams of exemplary processes 800 and 808 that are capable of being performed by one or more of these devices and/or components.

FIG. 8A is a flow diagram of an exemplary process 800 for creating and/or editing super security policies. As shown, process 800 may start by receiving a specified set of conditions and a specified set of actions for a super policy (block 802). The conditions and the actions may be specified in terms of one or more resources, user roles, zones, other security policies, and/or other rules. The conditions/actions may be received at policy application 402 on policy server device 208-x or super policy server device 210-x, via a user interface, such as a client application, and stored as part of a record in super policy database 408.

A consistency check on the specified sets of conditions and actions in the super policy may be performed (block 804). For example, given a super policy, policy application 402 may test whether a specified user role is valid, whether a specified zone exists, whether a specified security policy can affect other specifications, etc. For example, if a user specifies conditions and actions for super policy 708 in FIG. 7, policy application 402 may test if policy 3 designated in condition field 704 can be satisfied at the same time Mars zone is accessed. If the conditions are inconsistent, policy application 402 may notify the user, who may further edit super policy 708.

The super policy may be propagated to one or more policy server devices 208, super policy devices 210, and/or enforcement devices 206 (block 806). For example, if the super policy involves a condition that tests if a specific resource with an IP address of 191.82.42.11 is accessed, the super policy may be propagated to enforcement device 206-x that manages the specific resource. In a different implementation, the super policy may be sent to different agents that monitor various nodes in private network 204.

At block 806, process 800 may return to block 802, to receive specified sets of conditions/actions for another super policy.

FIG. 8B is a flow diagram of an exemplary process 808 for controlling network access by applying a super policy. In brief, to apply the super policy, conditions and actions that are specified in a super policy record may be monitored and performed, respectively. More specifically, the conditions may be monitored by devices to which the super policy record has been propagated at block 806 (FIG. 8A). If the devices detect that one or more of the conditions of the super policy record are satisfied, the devices may send messages to super policy device 212. Super policy device 212, in turn, may determine if all of the conditions of the super policy record are met based on the messages. If all of the conditions are met, super policy device 212 may put into effect actions that are specified in the super policy record.

As shown, process 808 may start at block 810, where one or more conditions of a super policy may be monitored (block 810). In different implementations, monitoring may be performed by different devices (e.g., client device 202-x, enforcement device 206-x, super policy device 212, etc.).

In one implementation, monitoring may entail detecting if a client is accessing or stops accessing one or more resources and/or zones that are specified in condition field 704 of a super policy record. For example, assuming zone 210-2 is specified in condition field 704 of the super policy record, if a client connects to network zone 210-2, enforcement device 206-1 may detect the client access to zone 210-2. In some situations, monitoring may involve detecting changes in status (e.g., whether a policy is enforced or not) of one or more security policies that are specified in condition field 704 of a super policy record. For example, enforcement device 206-x that monitors policy 3, which is specified in condition field 704 of super policy record 708, may detect whether policy 3 is enforced against a particular user.

In some implementations, the devices that monitor the conditions of the super policy may propagate messages that pertain to the conditions to super policy device 212. For example, when enforcement device 206-x detects a change in the status of a security policy (e.g., to/from 'enforced' status), enforcement device 206-x may send a message to super policy device 212. In some situations, a device may detect a change in the status of the security policy based on messages from other devices that monitor resources, zones, and/or security policies.

Depending on the implementation, propagating the messages may involve event-based processing. In such a case, accessing a resource/zone or giving an effect to a security policy may cause a message in the form of an event object to be generated and forwarded to super policy device 212. In addition, propagating the messages to super policy device 212 may involve intermediate devices. For example, assume that monitoring a super policy involves monitoring policy X, which, in turn, relates to zone 210-1. Also, assume that the policy X is monitored by policy server device 208-1 and zone 210-1 is monitored by enforcement device 206-1. When enforcement device 206-1 detects a user access to zone 210-1, enforcement device 206-1 may send a message to policy server device 208-1. Policy server device 208-1 may determine that policy X is enforced based on the message from enforcement device 208-1, and, in response, may send a message that pertains to policy X to super policy device 212.

In a different implementation, a centralized application or a device that processes super policies may periodically send queries about conditions of each super policy to a set of devices (e.g., client devices, servers, enforcement devices, policy server devices, etc.). The devices may respond to the queries, either after verifying a user access to a zone, a resource, etc., that are specified by the conditions of the super policy, or after the devices receive responses to their own set of queries from other devices.

It may be determined if all of the conditions of the super policy are satisfied (block 812). In one implementation, super policy device 212 may determine if all of the conditions are satisfied based on messages that originate from the devices that monitor the conditions of the super policy. For example, super policy device 212 may determine if all of the conditions of super policy record 708 are satisfied by examining messages about policy 3 and Mars zone (see condition field 704 for super policy record 708).

A set of actions that are associated with the super policy may be performed if all of the conditions of the super policy are satisfied (block 814). For example, super policy device 212 may put into effect a set of actions that are specified by action field 706 in a super policy record when all of the conditions in condition field 704 of the super policy record are satisfied. In some implementations, super policy device 212 may put into effect the set of actions by propagating messages/events to other devices (e.g., client devices 202, enforcement devices 206, policy devices 208, etc.). For example, if the conditions in condition field 704 of super policy record 708 are satisfied, super policy device 212 may send a message to enforcement device 206-x that manages Venus zone. Consequently, enforcement device 206-x, in turn, may prevent the user from accessing Venus zone.

In different implementations, the functionalities of super policy device 212 may be incorporated into other network devices, such as policy server device 204-x, enforcement device 206-x, etc. In such cases, messages that can propagate to/from super policy device 212 from/to other devices (e.g., devices that monitor conditions of super policies, devices that enforce super policies, etc.) as described above may flow between devices that incorporate the functionalities of super policy device 212 and the other devices. For example, if policy server device 208-x assumes the role of super policy device 212, policy server device 208-x may receive messages related to conditions that are specified in condition field 704 of a super policy record from other devices. In some situations, if the functionalities of super policy device 212 are hosted on a device that also monitors the conditions or enforces the actions of a super policy, no messages related to the super policy may be sent from or received at the device.

At block 814, process 808 may return to block 810 to continue to apply different super security policies.

EXAMPLE

Figure 9:
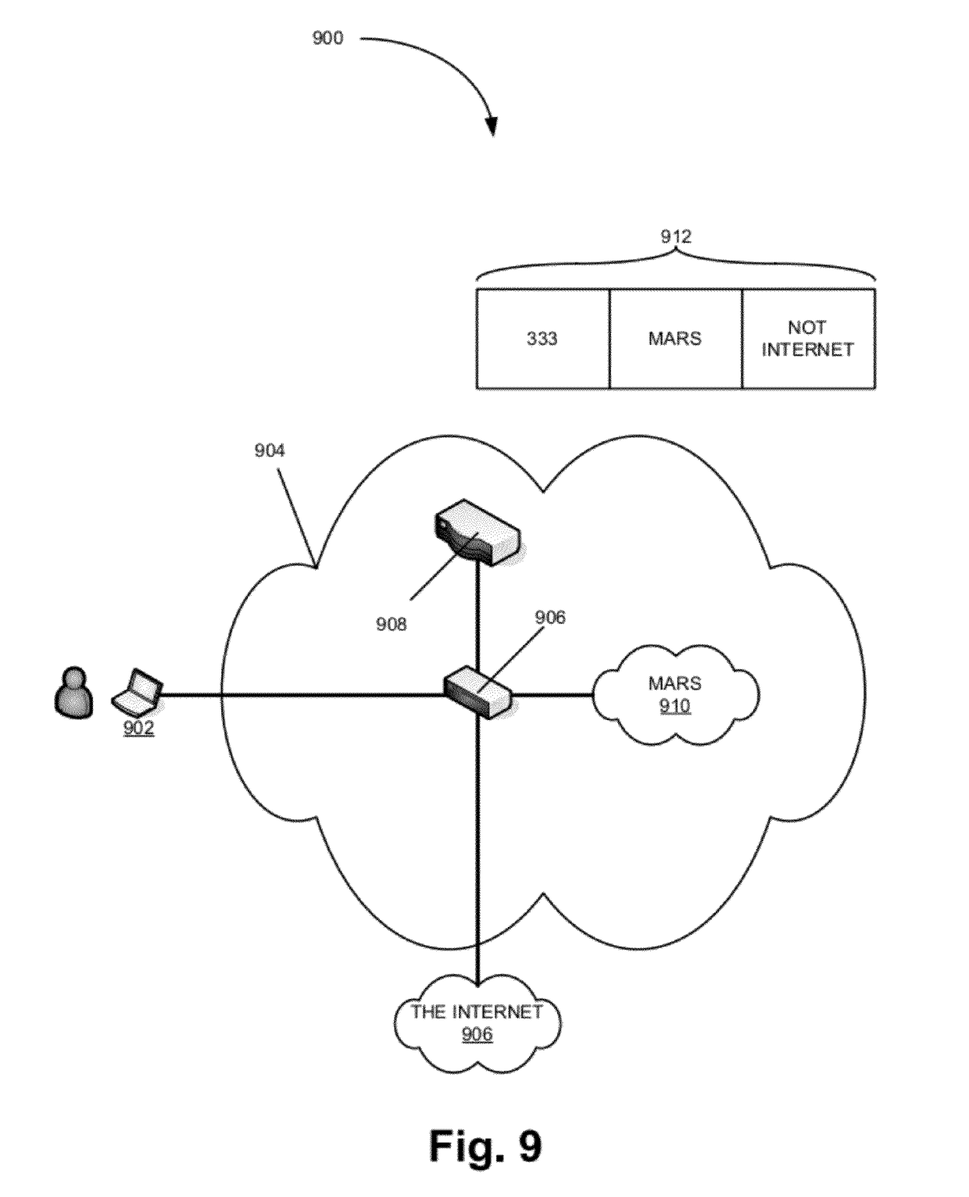
FIG. 9 is a block diagram of another exemplary network in which the concepts described herein may be implemented.

The following example, with reference to FIG. 9, illustrates applying super security policies. The example is consistent with exemplary processes 800 and 808 described above with reference to FIGS. 8A and 8B.

In the example, as illustrated in FIG. 9, network 900 includes a client device 902, a private network 904, and the Internet 906. Private network 904 includes an enforcement device 906, a policy server device 908, and Mars zone 910. Assume that enforcement device 906 manages user access to Mars zone 910 and the Internet 906, policy server device 908 pushes security policies to enforcement device 908, and Mars zone 910 includes a sensitive data center.

At policy server device 908, a security administrator specifies a set of conditions and a set of actions for a super policy 912. As shown, super policy 912 has a policy ID of 333, a condition field with "Mars," and an action field with "NOT Internet." Once the security administrator specifies conditions and actions for super policy 912 at policy server device 908, policy server device 908 checks if Mars 910 and the Internet 906 are valid zones and if it is possible for a user to access Mars 910 and to be prevented from accessing the Internet 906, without causing a conflict with other policies or super policies (not shown). Upon validating that super policy 912 is consistent (e.g., does not conflict with other security policies), policy server device 908 propagates super policy 912 to enforcement device 906, which monitors access to Mars zone 910 and the Internet 906.

A user logs into private network 904 and is granted an access to the Internet 906 based on a security policy (not shown). The user then decides to access Mars zone 910. When a user log accesses Mars zone 910, enforcement device 906 detects that a condition specified in super policy 912 is satisfied (e.g., Mars zone 910 is accessed). Subsequently, enforcement device 906 performs an action that is associated with super policy 912: enforcement device 906 prevents client device 902 from accessing the Internet while the user is accessing Mars zone 910.

The above example demonstrates how a super policy may be applied to control network access. More specifically, conditions and actions may be specified for super policies, based on user roles, zones, resources, security policies, and/or other rules. In addition, the super policies may be propagated to and enforced at other devices.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 8A and 8B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A device comprising:
a processor to:
    access a role policy database that includes one or more records;
    access a super policy database that includes one or more records, where each of the one or more records includes a condition field and an action field, where each condition field specifies information based on the one or more records in the role policy database;
    receive a message that indicates whether one or more conditions associated with at least one record in the super policy database is satisfied, where each of the one or more conditions is satisfied when
        a security zone in a private network is accessed by a user associated with one of the one or more records in the role policy database;
    determine, by examining one or more messages associated with the condition field and the action field included in the super policy database, whether all of the one or more conditions associated with the super policy are satisfied based on the message; and
    perform, when all of the one or more conditions associated with the super policy are satisfied, an action to control user access to one or more zones in the private network, where the action is based on the condition field and the action field of the one of the one or more records in the super policy database.

2. The device of claim 1, where the device includes at least one of:
a router, a firewall, a switch, or a server device.

3. The device of claim 1, where the device includes at least one of:
a policy server device that manages the role policy database;
a super policy device that monitors the super policy database, activates super policies, and enforces super policies; or
an enforcement device that enforces security policies.

4. The device of claim 1, where each of the one or more zones include a set of network resources to which a security policy can be uniformly applied.

5. The device of claim 1, where, when performing the action, the processor is to:
cause another device in the private network to permit or deny the user access to the one or more zones.

6. The device of claim 1, where the processor is further to:
send one or more messages to one or more client devices that are connected to the private network to perform the action.

7. The device of claim 1, where the message includes:
an event object that indicates an occurrence of a resource access; or
a request for information about whether the security zone has been accessed.

8. The device of claim 7, where the processor is further to:
receive a response to the request, the response indicating whether the security zone has been accessed.

9. The device of claim 1, where each of the one or more zones excludes all other zones.

10. The device of claim 1, where the processor is further to:
receive the super policy from a user or a security administrator.

11. The device of claim 10, where the processor is further to:
 push the super policy to other devices in the private network.

12. The device of claim 1, where the processor is further to:
 allow a user to assume a role based on authentication requirements and to access the security zone based on the role.

13. The device of claim 1, where a security policy is associated with the user and the security policy includes one of:
 a user role policy that governs what role a user can assume;
 a resource policy that governs which client application or client device may access a resource or a zone; or
 a super policy that governs which resource or zone may or may not be accessed when a set of conditions associated with the super policy are satisfied.

14. A method comprising:
 accessing, by a device, a role policy database that includes one or more records;
 accessing, by the device, a super policy database that includes one or more records, where each of the one or more records includes a condition field and an action field, where each condition field specifies information based on the one or more records in the role policy database;
 receiving, by the device, a message that indicates whether one or more conditions associated with at least one record in the super policy database is satisfied, where each of the one associated with one of the one or more records in the role policy database;
 determining, by the device and by examining one or more messages associated with the condition field and the action field included in the super policy database, whether all of the one or more conditions associated with the super policy are satisfied based on the message;
 propagating, by the device and in response to determining that all of the one or more conditions associated with the super policy are satisfied, a change in status of a security policy, associated with the user, to one or more devices that coordinate with each other to implement a super policy, where the change is based on the condition field and the action field of the one of the one or more records in the super policy database;
 detecting, by the device, whether conditions for triggering actions that are associated with the super policy are present based on the change in status; and
 performing, by the device, the actions if the conditions for triggering the actions are present.

15. The method of claim 14, further comprising:
 authenticating the user;
 allowing the user to assume a predefined role when the user is authenticated; and
 permitting the user to access the security zone when the user assume the predefined role.

16. The method of claim 14, where monitoring the security policy includes:
 detecting a user access to resources within security zone.

17. The method of claim 14, further comprising:
 accepting the super policy from a security administrator.

18. The method of claim 17, further comprising:
 propagating the super policy to devices in the private network.

19. The method of claim 14, where performing the actions include:
 permitting or denying user access to different resources within at least one other security zone in the private network.

20. A non-transitory computer-readable medium comprising:
 one or more instructions which, when executed by at least one processor, cause the at least one processor to access a role policy database that includes one or more records;
 one or more instructions which, when executed by the at least one processor, cause the at least one processor to access a super policy database that includes one or more records, where each of the one or more records includes a condition field and an action field, where each condition field specifies information based on the one or more records in the role policy database;
 one or more instructions which, when executed by the at least one processor, cause the at least one processor to receive a message that indicates whether one or more conditions associated with at least one record in the super policy database is satisfied, where each of the one or more conditions is satisfied when
  a security zone in a private network is accessed by a user associated with one of the one or more records in the role policy database;
 one or more instructions which, when executed by the at least one processor, cause the at least one processor to determine, by examining one or more messages associated with the condition field and the action field included in the super policy database, whether all of the one or more conditions associated with the super policy are satisfied based on the message; and
 one or more instructions which, when executed by the at least one processor, cause the at least one processor to perform, when all of the one or more conditions associated with the super policy are satisfied, an action to control user access to one or more zones in the private network, where the action is based on the condition field and the action field of the one of the one or more records in the super policy database.

21. The non-transitory computer-readable medium of claim 20, where a security policy is associated with the user and the security policy includes at least one of:
 a user role policy that governs what role a user can assume;
 a resource policy that governs which client application or client device may access a resource or a zone; or
 a super policy that governs which resource or zone may or may not be accessed when a set of conditions associated with the super policy are satisfied.

* * * * *

UNITED STATES PATENT AND TRADEMARK OFFICE
CERTIFICATE OF CORRECTION

PATENT NO. : 8,161,521 B1
APPLICATION NO. : 12/042577
DATED : April 17, 2012
INVENTOR(S) : Jeffrey C. Venable, Sr.

It is certified that error appears in the above-identified patent and that said Letters Patent is hereby corrected as shown below:

Claim 14, column 11, lines 29-30, should read: "each of the one or more conditions is satisfied when a security zone in a private network is accessed by a user associated with one of the one or more records in the role policy database;"

Signed and Sealed this
Fifteenth Day of May, 2012

David J. Kappos
*Director of the United States Patent and Trademark Office*